United States Patent [19]
Ogden, Sr.

[15] 3,659,076
[45] Apr. 25, 1972

[54] AIR COOLED WELDING GUN

[72] Inventor: Ralph Ogden, Sr., 1304 Fisher Street, Munster, Ind. 46321

[22] Filed: June 3, 1970

[21] Appl. No.: 43,100

Related U.S. Application Data

[63] Continuation-in-part of Ser. No. 838,419, July 2, 1969, Pat. No. 3,596,049.

[52] U.S. Cl. ................................ 219/130, 219/74, 219/136
[51] Int. Cl. ............................................................. B23k 9/00
[58] Field of Search ..................... 219/137, 130, 136, 75, 74

[56] References Cited

UNITED STATES PATENTS

| | | | |
|---|---|---|---|
| 3,253,116 | 5/1966 | Kensrue | 219/130 |
| 2,727,970 | 12/1955 | Turbett | 219/130 |
| 3,283,121 | 11/1966 | Bernard et al. | 219/130 |
| 3,469,070 | 9/1969 | Bernard et al. | 219/130 |

Primary Examiner—J. V. Truhe
Assistant Examiner—George A. Montanye
Attorney—Mann, Brown, McWilliams & Bradway

[57] ABSTRACT

The disclosure is directed to a welding gun for MIG welding in which the gas cup and contact tip of the nozzle are secured in place by a single clamp type device that permits ready replacement of both. The nozzle in turn is connected to the gun handle by a single clamp device that permits ready replacement of the nozzle as a unit or ready change of positioning of same relative to the handle. The nozzle is arranged to provide for cooling of the gas cup through air fins on the nozzle that are in electrically insulating good heat transfer relation to the gas cup. The nozzle is in the form of an elongate extruded body having its end portions threaded for threaded attachment thereto at its handle end of a finger forming fitting to which the clamp that holds the nozzle to the gun handle is applied, and for attachment to its discharge end a finger forming fitting to which is applied the clamp that holds the gas cup and contact tip in place. Interposed between the gas cup and the body discharge end fingers is a contractable sleeve formed from a material having good heat conducting characteristics that is covered with a coating of a material that is electrically insulating but of good heat conducting characteristics.

20 Claims, 25 Drawing Figures

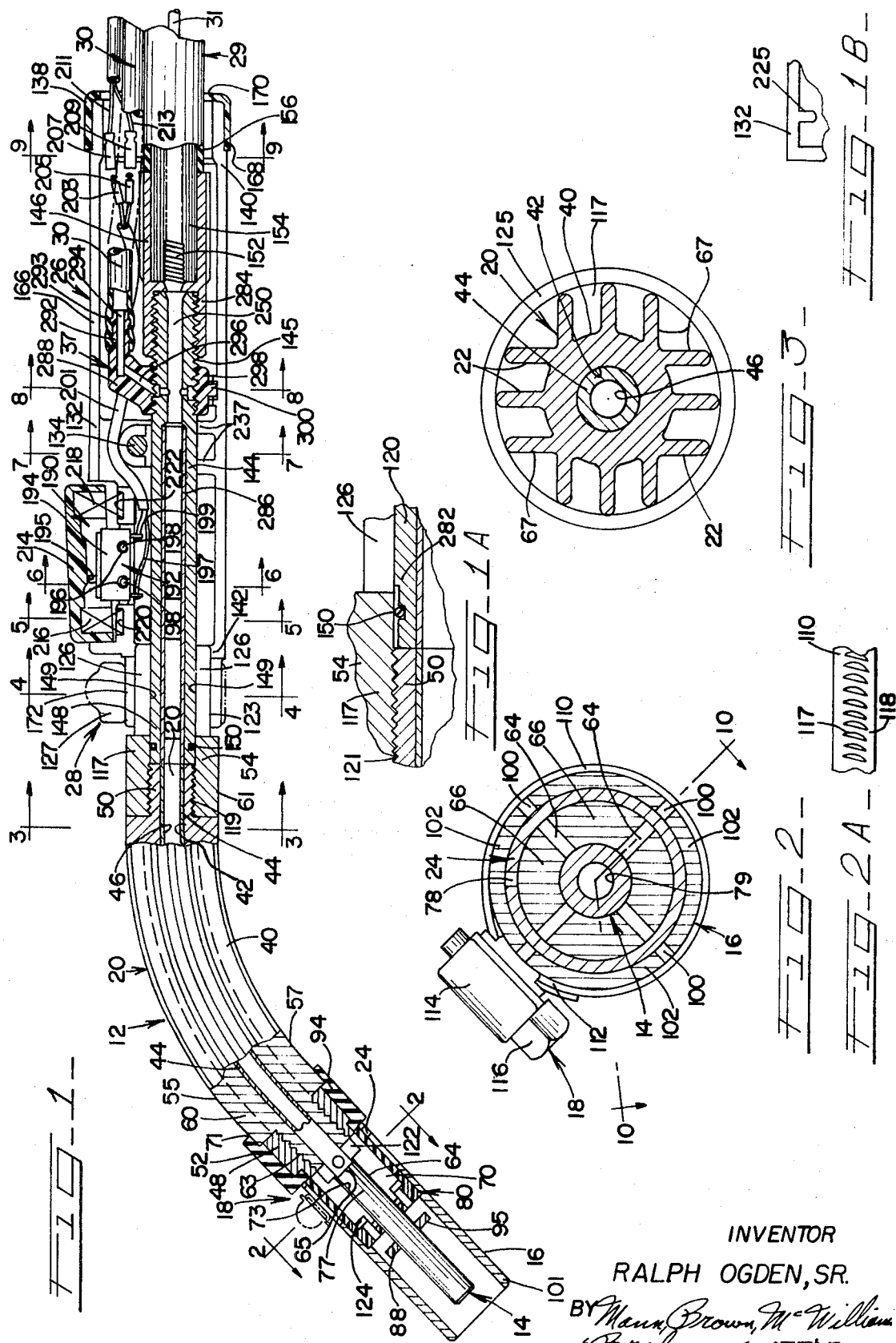

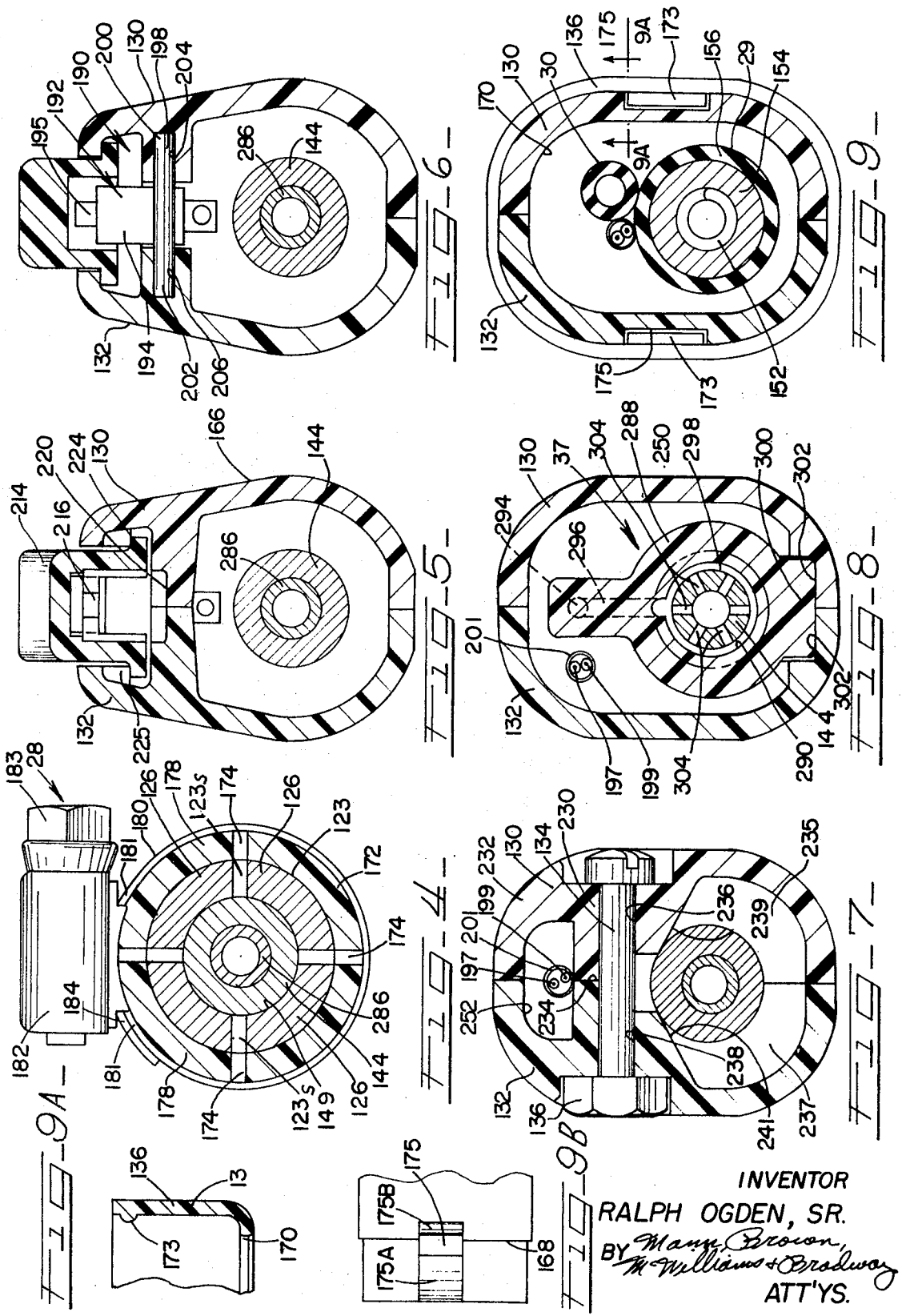

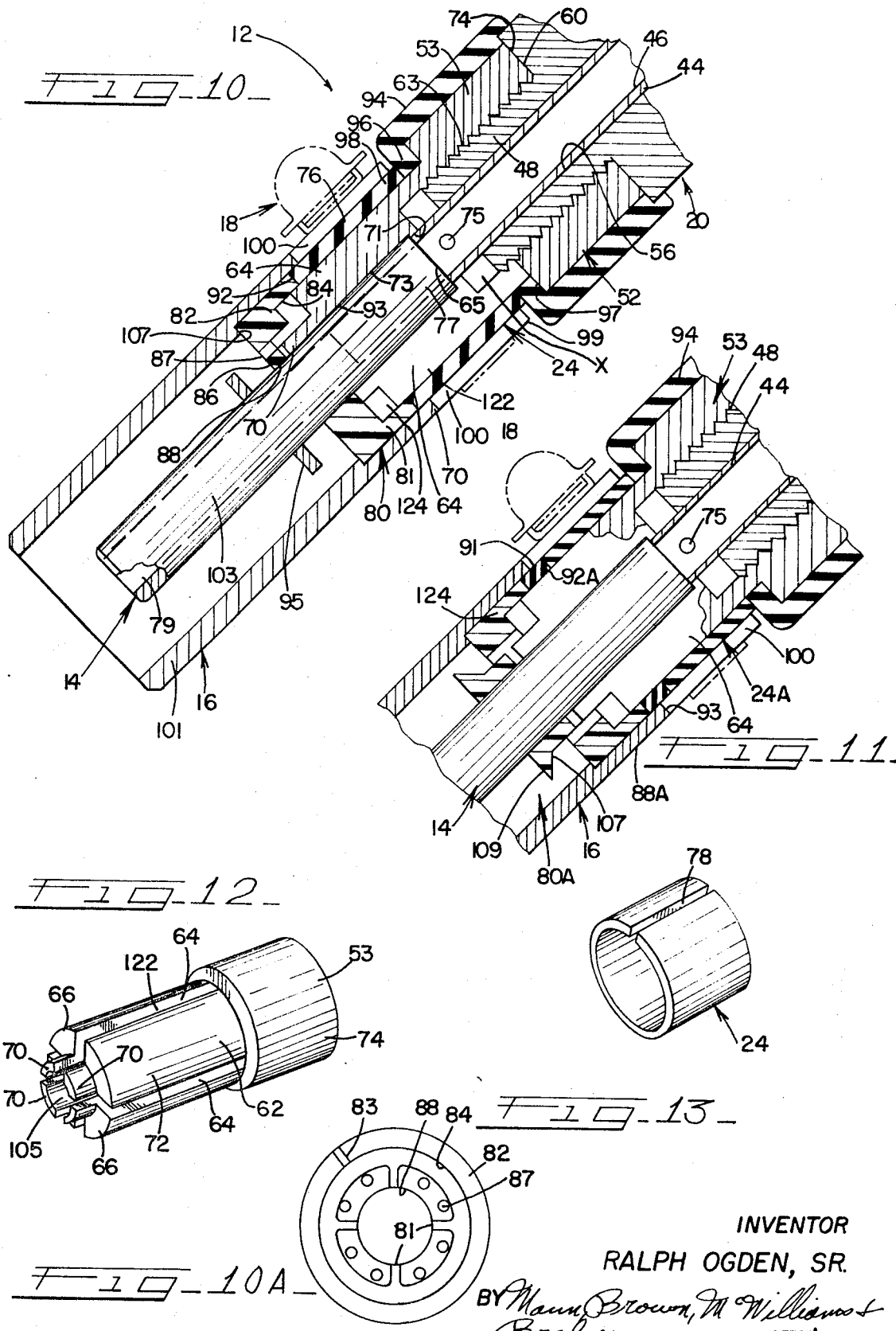

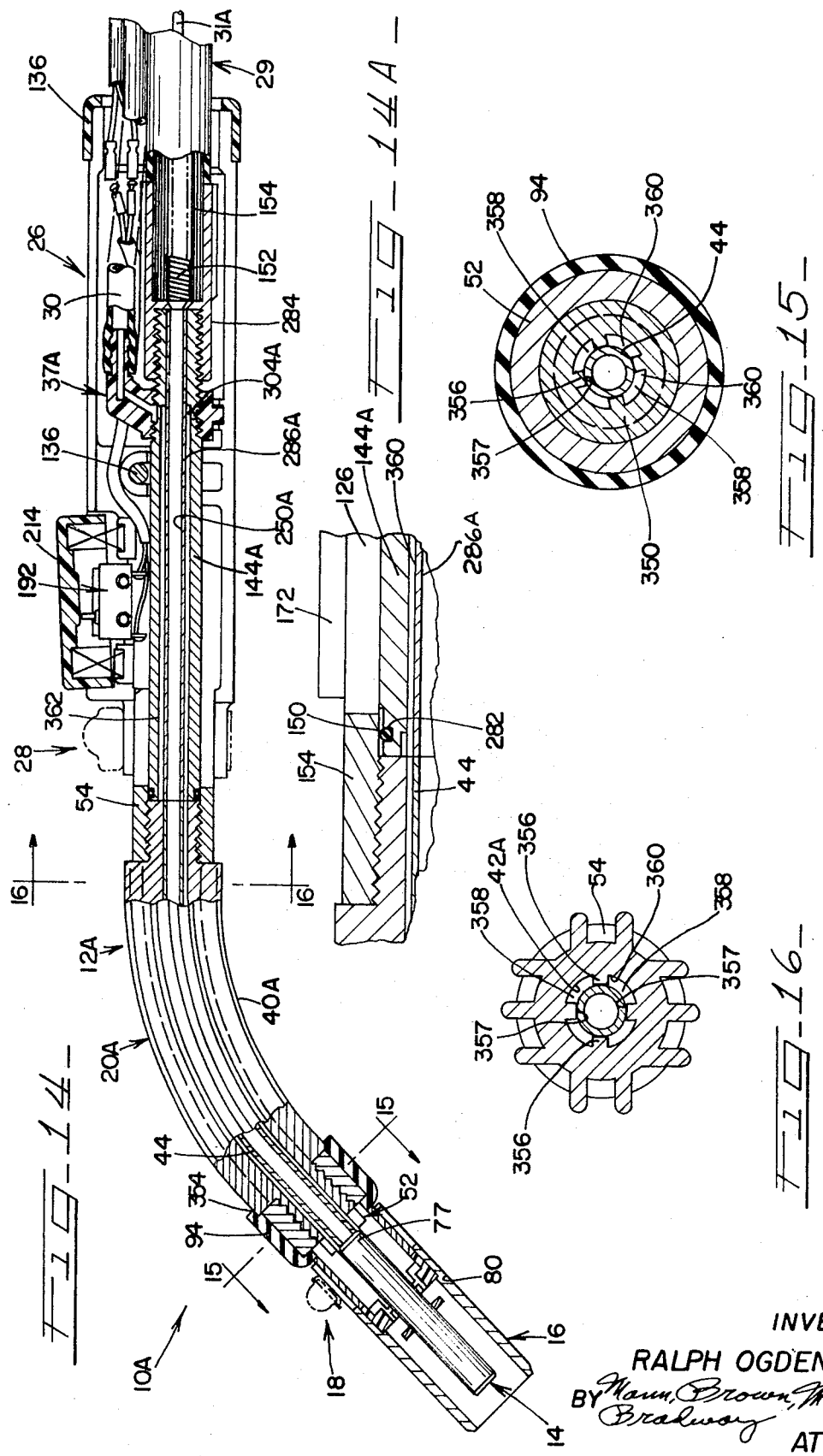

AIR COOLED WELDING GUN

This application is a continuation-in-part of my application Ser. No. 838,419, filed July 2, 1969, now U.S. Pat. No. 3,596,049, granted July 27, 1971.

This invention relates to a welding gun for semi-automatic welding, and more particularly to a welding gun arrangement that is especially designed for metallic electrode inert gas welding (known in the art as MIG welding).

Conventional guns for MIG welding provide no satisfactory way of preventing heat build up in the gun gas cup, with the result that after prolonged use the spatter which accompanies all MIG welding starts to pit the inside surface of the gas cup which makes it difficult to remove and results in early failure of the gas cup. Tests have shown that as long as the gas cup is maintained sufficiently cool, it will last almost indefinitely so long as mechanical damage to it is avoided.

Furthermore, the securement of contact tips and gas cups conventionally is separately accomplished and ordinarily by means of screw threading that is easily damaged.

A principal object of this invention is to provide an MIG welding gun that is specially arranged for air cooling of the gas cup.

Another principal object of the invention is to provide an MIG welding gun in which the gas cup and contact tip are clamped in place by the same securing device, and in which the gas cup is electrically insulated from the contact tip by an element having good heat conducting characteristics.

Further objects of the invention are to provide an MIG welding gun in which the nozzle may be readily adjusted to 360° about its handle and/or, if desired, the entire nozzle replaced, to provide a finned air cooling nozzle arrangement for cooling the gas cup through heat conduction therefrom, and to provide a welding gun for MIG welding that is economical of manufacture, convenient in use, and long lived in operation.

In accordance with this invention, there is provided a welding gun for MIG welding in which the gas cup and the contact tip therefor are simultaneously secured in place by a single clamping arrangement, and the nozzle includes outwardly projecting fins to which heat from the gas cup is transferred through a heat conduction path that includes means for electrically isolating gas cup from the gas cup is transferred through a heat conduction path that includes means for electrically isolating the gas cup from the contact tip. The nozzle is fixedly connected to its handle by a clamp arrangement that permits ready adjustment or replacement of the nozzle in relation to its handle. The handle of the gun is of sectionalized construction for facilitating manufacturing and assembly of same, while the nozzle in the form of a one piece body adapted for extrusion from aluminum or the like and having its end threaded to receive fitting element formed with contractable fingers adapted to be receive under the respective clamps that hold the gas cup and contact tip to the discharge end of the nozzle, and the other end of the nozzle to the gun handle.

Other objects, uses, and advantages will be obvious or become apparent from a consideration of the following detailed description and the application drawings in which like reference numerals are used to designate like parts throughout the several views.

In the drawings:

FIG. 1 is a diagrammatic plan view of one embodiment of the invention designed for 500 amp welding, with parts being broken away and shown in section to expose other parts;

FIG. 1A is a fragmental sectional view of a portion of the fixed but adjustable connection of the nozzle to the gun handle;

FIG. 1B is a fragmental view of a portion of the switch chamber defined by the gun handle;

FIG. 2 is a diagrammatic sectional view taken substantially along line 2—2 of FIG. 1 and rotated 45 degrees;

FIG. 2A is a fragmental view of the hose clamp device shown in FIG. 2 for securing the gas cup and contact tip in place;

FIGS. 3-9 are diagrammatic sectional views taken substantially along the section lines illustrated in FIG. 1;

FIG. 9A is a fragmental view taken substantially along line 9A—9A of FIG. 9;

FIG. 9B is a fragmental elevational view of the end portion of one of the handle sections that receives the handle assembly end cap;

FIG. 10 is an enlarged view of the arc forming end of the nozzle shown in FIG. 1 and is taken along line 10—10 of FIG. 2;

FIG. 10A is an end view of the nozzle diffuser element, taken from the inside end of same;

FIG. 11 is a view similar to that of FIG. 10, but illustrating a modification;

FIG. 12 is a perspective view of the fitting element employed at the discharge end of the gun nozzle;

FIG. 13 is a perspective view of the electrically insulating split sleeve that is in heat conducting relation between the gas cup and the nozzle;

FIG. 14 is a view similar to that of FIG. 1 showing an embodiment of the invention arranged for 300 amp. welding;

FIG. 14A is a view similar to that of FIG. 1A for the embodiment of FIG. 14;

FIGS. 15 and 16 are diagrammatic sectional views taken substantially along the section lines illustrated in FIG. 14.

Figure 17:
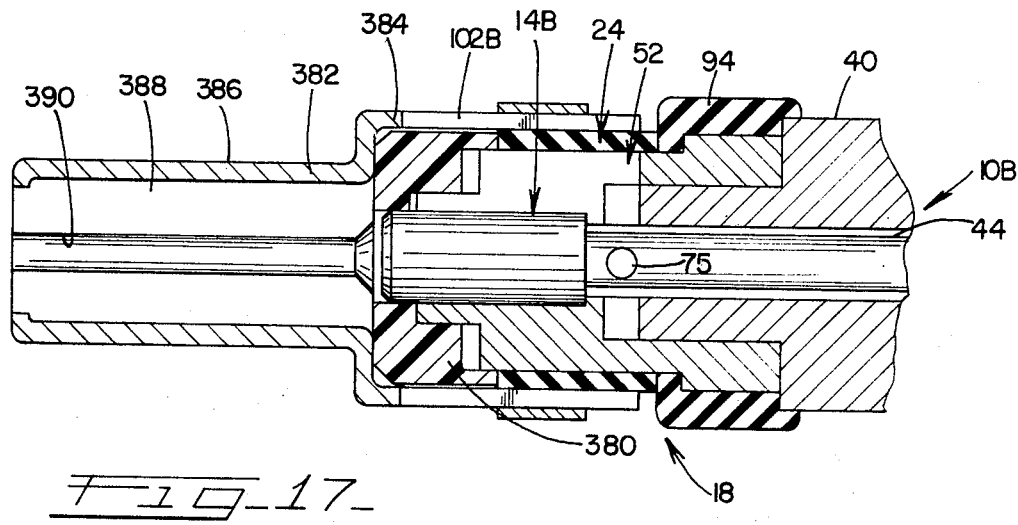
FIGS. 17 and 18 illustrate the gun of this invention modified for welding with gasless cored wire.

However, it is to be distinctly understood that the drawing illustrations provided are supplied primarily to comply with the requirements of the Patent Code, and that the invention may have other specific embodiments that will be obvious to those skilled in the art.

GENERAL DESCRIPTION

Reference numeral 10 of FIG. 1 generally indicates one welding gun embodiment in accordance with this invention, arranged for 500 amp MIG welding, which comprises a nozzle assembly 12 that includes contact tip 14 and jacketing gas cup 16 that are secured to the nozzle assembly 12 by clamp device 18. The nozzle assembly 12 further comprises a nozzle structure 20 that is finned as at 22 for good heat dissipating characteristics, and which is in good heat conducting relation to the contact tip 14; nozzle structure 20 is also in good heat conducting relation to gas cup 16 through an electrically insulating sleeve 24 formed from material of good heat conducting characteristics interposed between the nozzle structure 20 and the contact tip.

The nozzle assembly 12 is secured to handle assembly 26 by clamp device 28. The handle assembly 26 is connected to the usual cable 29 and conduit 30 for supplying the electrical energy, the welding wire 31, and the usual shielding gas to the gun.

In accordance with this invention, the claim device 18 serves to clamp both the contact tip 14 and the gas cup 16 to the nozzle assembly and without requiring any screw-threaded connection between these parts and the nozzle assembly. The gas cup fits directly over and engages the electrically insulating sleeve 24, which is annularly contractable, and has good heat transfer characteristics for conducting heat from the gas cup 16 to the nozzle structure 20 for dissipation of the heat from fins 22. Contact tip 14 is held by nozzle structure 20 and is also cooled by heat passing from same to fins 22.

The clamp device 28 permits the operator to readily position the nozzle assembly 12 at any desired position relative to the handle assembly 26, 360 degrees about the axis of the latter, or permits ready removal and replacement of the nozzle assembly 12 as a unit, at the option of the operator.

Other improvements and advantages in the specific arrangements illustrated in the drawing figures will become apparent as the description proceeds. For instance, the handle assembly 26 includes a special gas manifold 37 that insures a leak-free connection between conduit 30 and the gun.

Figure 18:
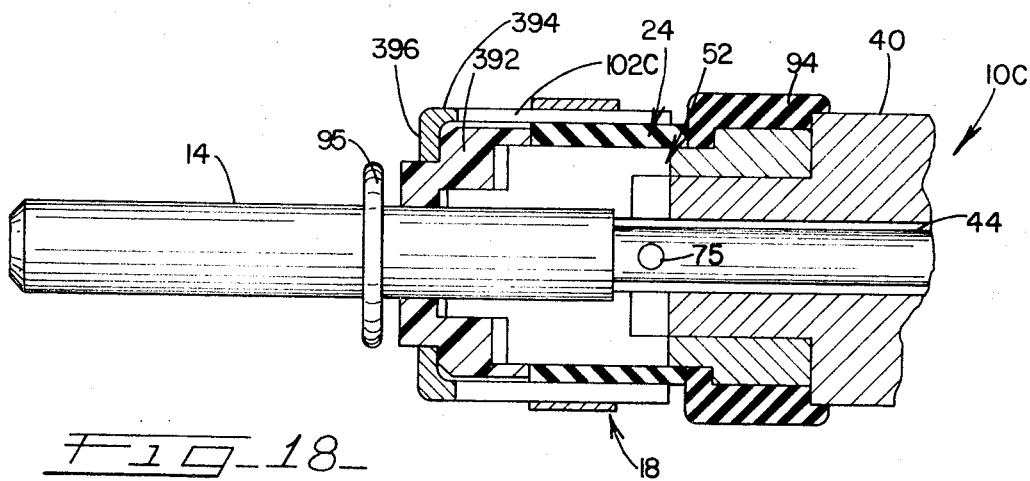

FIG. 14 illustrates another embodiment 10A arranged for 300 amp. welding involving the important features of gun 10, but modified for lower amp service, while FIGS. 17 and 18 illustrate several forms of the gun arranged for welding using gasless cored wire.

SPECIFIC DESCRIPTION

The nozzle structure 20 comprises an elongated gooseneck shaped body 40 that may be conveniently extruded from aluminum or the like and is shaped to have the finned configuration indicated in FIG. 3. Body 40 is angled longitudinally thereof in the manner indicated in FIG. 1 and is shaped to define a longitudinally extending bore 42 which receives a tubular welding wire guide 44 of suitable wear resisting characteristics that in turn defines a bore 46 through which the welding wire and shielding gas pass.

AS indicated in FIG. 3, fins 22 are not radial; rather, the fins 22 along the convex and concave sides of body 40 are in parallelism (and are parallel to the plane of the bend in body 40), but are perpendicular to the fins of the other two sides of body 40 (which lie perpendicular to the plane of bend of body 40). This facilitates bending of the body 40 as the fins 22 bend only in their respective planes or perpendicular thereto, which avoids buckling and permits ready removal of bending machine elements engaging body 40.

The body 40 is formed to define threaded end portions 48 and 50 that receive the respective fitting elements 52 and 54 that are formed to provide for securement of the body 40 within the clamp devices 18 and 28. The exterior surface of body 40, including all surfaces of fins 22, and after it is bent to the curved configuration of FIG. 1, are coated with a thin coating of a suitable electrically insulating substance that is resistant to mechanical displacement and does not impede heat transfer from the nozzle.

In one embodiment of the invention, the exterior of body 40 is hard anodic coated to a depth of about .002 inch to provide the desired electrical insulating. Hard anodic coating of aluminum provides a coating or covering 67 formed of aluminum oxide that is electrically insulating. Any one of the conventional hard anodic coating procedures known may be employed for this purpose, several being identified in the article by R. V. Vanden Berg entitled "Characteristics of Hard Anodic Coatings on Aluminum" that appeared in the Mar. 15, 1962 issue of Design Magazine (pages 3–7). Alternately, a suitable epoxy resin may be employed.

The fitting element 52 includes a cap portion 53 internally threaded as at 63 to receive externally threaded end portion 48 of body 40, the latter having end portion 56 of bore 42 that is proportioned to closely receive the welding wire guide 44, which extends therethrough up to close engagement with the contact tip 14. Fitting element 52 also comprises a sleeve portion 62 (see FIG. 12) of decreased external diameter, with the fitting element 52 being formed with gas conveying slots 64 that are equally spaced apart about its circumference and extend longitudinally thereof to define spaced fingers 66. As indicated in FIG. 10, the slots 64 extend to its cap portion 53. The fingers 66 each include an extension 70 of reduced thickness at the outwardly extending end 72 of the element 52, the inwardly extending end 74 comprising the cap 53 which is threaded on the body 40. Fitting element 52 defines a short bore 71 that receives the end 65 of guide 44 and a bore 73 through sleeve portion 62 that is proportioned to closely receive contact tip 14, the fitting element 52 thus forming the contact tip collet or gripping portion of the gun.

The electrically insulating sleeve member 24 (see FIG. 13) is received over the fingers 66 of the fitting element 52, and in accordance with this invention, it is formed from a material of good heat conducting characteristics, and is covered or coated with a coating or layer of an electrically insulating substance 76 (sleeve member 24 is shown sectioned for insulating material in the drawings as a convenient way to emphasize its electrically insulating characteristics). Sleeve 24 is made annularly contractable, that is, contractable radially of the fitting element 52, in a suitable manner, as by giving same an internal diameter that is on the order of the external diameter of the sleeve portion 62 of fitting element 52, and splitting same longitudinally thereof as at 78 (see FIG. 13).

In accordance with one embodiment of the invention the sleeve element 24 is formed from aluminum and is hard anodic coated to a depth of about .002 inch to provide the desired electrical insulation. Preferably all surfaces of sleeve member 24 have this coating, which may be of the same type as referred to above in connection with coating 67 of nozzle body 40.

Alternately, an aluminum sleeve having the configuration indicated in FIG. 13 may be coated by a suitable electrically insulating adhesive, such as Scotch Weld 2214 Hi-Temp adhesive made by 3M Company.

The contact tip 14 itself is conventional except that its inner end 77 is unthreaded and proportioned to closely fit within bore 73 of fitting element 52. It defines the usual bore 79 to closely receive the welding wire 31 for making the conventional welding current contact therewith. Contact tip end 77 seats against the end 65 of guide 44, which is formed with several openings 75 for gas flow into slots 64 of element 52. Openings 75 discharge into a gas pooling area X that is defined by body end portion 48 and fitting element 52, and that is open to slots 64.

In the embodiment of FIGS. 1–10, 12 and 13, contact tip 14 has received over same a diffuser element 80 comprising a sleeve portion 82 with its bore 84 having a diameter that substantially complements the external diameter of the fitting element sleeve portion 62 for close fitting relation therewith. Diffuser element 80 also defines a flange 86 having bore 88 that substantially complements the external diameter of the contact tip for close fitting relation therewith.

The diffuser element 80 is formed from a suitable electrically insulating heat resisting plastic, and is shaped to define a plurality of gas passages 87 substantially equally spaced about its circumference in its flange 86. As seen in FIG. 10A, diffuser element 80 at its inner side is formed with spaced bracing shoulders 81 that engage the contact tip and are proportioned to loosely fit into the slots 64 of fitting extension 70 for locating purposes. Sleeve portion 82, which abuts end 92 of insulating sleeve 24, includes an inwardly extending projection 83 which loosely fits within the split 78 of sleeve 24 and is positioned circumferentially to locate split 78 approximately midway between a slot 64 of fitting element 52. Shoulders 81 and projection 83 have a thickness circumferentially of element 80 such fingers 66 and element 24 can contract to the full extent required by the operation of clamp device 18.

In accordance with the present invention, the contact tip 14 has fixed thereto a weld spatter guard in the form of disc 95 fixed to tip 14 in any suitable manner (as by force fitting) and proportioned to overlie openings 87 of diffuser 80 to shield same from weld spatter, which accumulates on the outwardly facing side of disc 95.

Received over the cap portion 53 of fitting element 52 is an electrically insulating sleeve member 94 formed of silicone rubber or the like and defining a flange portion 96 received between the end 98 of the insulating sleeve member 24 and the shoulder 97 of the fitting element 52. Sleeve member 94 serves as a bumper guard for the gun and insulator for cap portion 53 of element 52.

The gas cup 16 is formed from any suitable material, such as aluminum, copper or brass, and its end 101 that extends beyond the contact tip in the direction of the work has the conventional annular configuration. The other end 99 thereof is formed with a plurality of slots 100 (see FIG. 2) to define spaced fingers 102 that are received over the electrically insulating sleeve 24 and extended toward the electrically insulating sleeve 94 at the end 99 of the gas cup.

As indicated in FIG. 10, the fingers 102 of the gas cup have an internal configuration such that they substantially complement and closely fit over the insulating sleeve 24, while the fingers 66 of the fitting element 52, which incidentally form the fingers of the nozzle structure 20, are proportioned to substantially complement and closely fit over the contact tip external surface 103, when the clamp device 18 is in its released position. The internal surfaces 105 of finger 66 are preferably copper or silver plated to avoid layers of oxide from building up at this point, and such surfaces are free from screw threading, in accordance with this invention.

Gas cup 16 is formed with an internal shoulder 107 adapted to seat against the diffuser element 80 in the assembled relation of the nozzle structure.

The diffuser arrangement of FIGS. 1 and 10 is suitable where carbon dioxide is to be used as the shielding gas. Where more expensive gases, such as Argon, are to be regularly used, the arrangement of FIG. 11 is preferred, wherein seal element 91 is received between the end 92A of a shortened electrically insulating sleeve 24A and flange extension 88A of diffuser 80A under the ends 93 of slots 100 of the gas cup. Seal 91 takes the place of a corresponding portion of the insulating sleeve 24A of the embodiment of FIGS. 1 and 10, and may be formed from any suitable high temperature resisting gas flow sealing material such as rubber of suitable characteristics or its equivalent. Seal 91 is notched to receive projection 83 and is in turn formed with a similar projection that locates split 78 of sleeve 74A in the manner previously indicated.

In the embodiment of FIG. 11, diffuser 80A also includes an alternate form of weld spatter shield in the form of a conical extension 107 having a base 109 of a diameter suitable to protect diffuser openings 87 from spatter.

The clamp device 18 in practice may be of any suitable type, but in the form shown is of the familiar hose clamp type comprising a metal strip 110 shaped to annular form with one of its ends 112 anchored in housing 114 that journals a screw element 116 formed with suitable threads in meshing relation with spaced slots 117 (see FIG. 2A) formed in strip 110. End 118 of strip 110 extends over end 112 and through housing 114 for engagement with screw element 106, which when rotated relative to housing 114, feeds strip end 118 one way or the other to expand or contract the hose clamp.

When the fitting element 52 has been applied to the end 48 of nozzle structure 20, and the contact tip 14, insulating sleeves 24 and 94, diffuser element 80, and the gas cup 16 have been applied in the manner indicated in FIG. 10, as by slipping them into place to the respective positions indicated, application of the clamp device 18 about the end 99 of the gas cup and tightening of same thereabout (as by turning screw element 116 in the appropriate direction) contracts and compresses the end 99 of the gas cup against the insulating sleeve 24, which in turn contracts inwardly against the fingers 66 of fitting element 52, which are in turn deflected inwardly against the contact tip 14 to hold it firmly in place. Removal and changing of the contact tip and gas cup is readily effected by loosening the clamp device 18 so that the contact tip and gas cup may be appropriately gripped to be withdrawn, as necessary, from the gun to be replaced by suitable replacements of similar configuration, after which the clamp device 18 may be again tightened to secure the replacement in place.

As will be observed from FIGS. 1, 2 and 10, the bore 79 of the contact tip is aligned with the bore 46 of guide tube 44, for passage therebetween of the welding wire 31. The shielding gas also passes through the bore 46 of the guide tube, proceeding through the guide openings 75 and pooling area X into the spaced gas passages 122 that are defined by the slots 64 of the fitting element 52 and the parts overlying and underlying same, which lead to a pooling chamber 124 (see FIG. 10) defined by the diffuser element 80 and the end 72 of the fitting element 52, from which the gas passes through the openings 87 of the diffuser element and outwardly of the gas cup in an annular flow for shielding of the arc.

The fitting element 54 at the other end 50 of the nozzle body 40 (see FIG. 1) defines a cap portion 117 that is internally threaded as at 119 to receive the nozzle body threaded extension 50, a bore 149 (see FIG. 4) that aligns with the end 120 of guide 44, and a sleeve portion 123 which is slotted as at 123S (see FIG. 4) to define fingers 126 that are received within the handle assembly 26 underneath the clamp device 28. The surfaces that are exposed are suitably insulated, as by being hard anodic coated in the same manner as sleeve 24.

The handle assembly 26 generally comprises a pair of housing sections 130 and 132 secured together by a bolt 134 (see FIG. 7) cooperating with nut 136, hollow end cap 138 at the handle assembly end 140, and the clamp device 28 at the housing end 142. Sections 130 and 132 may be formed from a suitable plastic of adequate electrically insulating and thermal stability qualities, such as the high impact fiberglas phenolic resin molding compound made and sold by Fiberite Corporation and identified as FS-5064.

Received between the handle assembly sections 130 and 132 is adapter tube 144 formed from aluminum or copper or the like that is threaded as at 145 to receive the gas manifold 37 as well as cable adapter fitting 284, the latter forming the end 146 of the adapter tube 144. The bore 250 of adapter tube 144 is shaped to receive a hardened steel liner 286 that extends between the manifold 37 and its end 148 and tube 144 is proportioned to extend into bore 149 of fitting element 54 when the nozzle and handle assemblies are in assembled relation. The adapter tube is recessed as at 282 to receive suitable seal 150 that is disposed in gas sealing relation with fitting element 54. Adapter fitting 284 has the cable 29 suitably fixed therein.

Finger 126 of the nozzle structure fitting element 54 grip the adapter tube end 148 when clamp 28 is operative, and their internal surfaces 149 are preferably copper or silver coated for the same reasons as fingers 66.

Cable 29, as is conventional, comprises a wire helix 152 through which the welding wire 31 moves, which has applied about it copper wiring 154 covered by suitable insulating material 156. As is conventional, the welding wire 31 is supplied from a reel containing a source of supply of same, while the wiring 154 is suitable electrically connected to the welding machine. The electrical circuit involved between the cable 29 and the contact tip 14 is from the cable 29 through tube 144 and nozzle body 40 including its fittings 54 and 52 and thence to the contact tip 14, where the welding wire picks up the current in the usual manner. In this connection, the fins 22 of body 40 also provide part of the electrical conducting path of the gooseneck, which reduces the amount of metal mass required to form the body 40.

The handle sections 130 and 132 define a housing 166, which at its end 140 is recessed about its outer periphery, as at 168, to frictionally receive the end cap 138 on same. End cap 138 defines opening 170 through which the cable 29 and conduit 30 pass into the handle assembly. The end cap 138 on either side thereof is formed to define a protuberance 173 that is adapted to snap into recess 175 of the respective housing sections (see FIG. 9) to provide a snap lock relationship between the housing 166 and its end cap 138, which can be readily released by consecutively prying protuberances 173 out of their recesses 175 (using a suitable screw driver of the like) so that end cap 138 can be readily slipped off the end 140 of housing 166. The respective housing sections are each formed with a sloping surface 175A leading to the recess 174 from the assembly end 140, and a slanted surface 175B that is used as the fulcrum for the tool used to pry the cap protuberances out of recesses 175.

The housing 166 at the end 142 of the handle assembly 26 is formed to define a sleeve portion 172 that is slotted as at 174 (see FIG. 4) to define fingers 178 between which the fingers 126 of the nozzle assembly fitting element 54 are received to provide the desired fixed but adjustable relation of assemblies 12 and 26.

The clamp device 28 may be of any suitable type and for purposes of illustration it is assumed to be similar to the clamp device 18 and thus is of the familiar hose clamp type including metal strip 180 shaped to annular form with one of its ends 181 anchored in housing 182 that journals screw element 183 in threaded engagement with the conventional spaced slots (not shown but seen FIG. 2A) of strip 180. The other end 184 extends over end 181 and through housing 182 for engagement with screw element 182. As in device 18, rotation of screw element 183 one way or the other expands or contracts clamp device 28.

It will thus be seen that when the clamping device 28 is actuated to secure the nozzle assembly 20 to the handle assembly 26, the fingers 178 of the housing 166 are contracted against the fingers 126 of the nozzle assembly, which are in turn contracted against the adapter tube 144, whereby the nozzle assembly 12 and handle assembly 26 are releasably secured to each other.

It will also be seen that the nozzle assembly can be readily adjusted relative to the handle assembly through an arc of 360 degrees at the option of the operator merely by loosening the clamp device 28 and manually positioning the nozzle assembly 20 as desired relative to the handle assembly 26, after which the clamp device is re-tightened. Similarly, the entire nozzle assembly 12, if and when found defective, can readily be replaced by loosening the clamp device 28, removing the defective nozzle assembly, applying the replacement nozzle assembly to the position indicated in FIG. 1, and re-tightening the clamp device 28.

The housing 166 defined by the handle assembly sections 130 and 132 is shaped to define a switch chamber 190 (see FIG. 6) in which is received a suitable off-on switch 192 that comprises the usual housing 196, push button 195 and suitable operating parts (not shown).

In accordance with this invention, the switch housing 194 is formed with a pair laterally extending openings 196 that each receive a mounting pin 198, which pins 198 have their respective end portions 200 and 202 respectively received in mounting recesses 204 and 206 of the housing 166. The switch 192 contains the usual electrical contacts that are adapted to be closed by deflection of push button 195, with the switch being connected by suitable leads 197 and 199 to the welding machine for purposes of actuating same in the usual manner. In the form shown, leads 197 and 199 extend through covering 201 to the connectors 203 and 205 that releasably connect with the respective sockets 207 and 209 in turn connected to the respective leads 211 and 213 which extend to the welding machine, for incorporation in a conventional welding circuit. Leads 197 and 199 proceed through the indicated recesses in the housing 166 to present their connectors 207 and 205 adjacent end cap 136.

In the specific arrangement illustrated, the switch chamber 190 is closed by thumb actuated trigger 214 that is biased outwardly of the switch chamber 190 by appropriate compression springs 216 and 218 that cooperate between same and the respective spring seats 220 and 222 there defined by the housing 166. Trigger 214 is flanged as at 224 (see FIG. 5) for suitable engagement with housing 166 such that the trigger 214 will be spaced from button 195 in the release position of same (and in the "off" position of the gun). In the form shown, the handle sections are each formed with lug 225 under which the trigger flange 224 is received to serve as a fulcrum for trigger 214, which insures ease of operation of same in any position grasped by the operator.

The sections 130 and 132 of the handle assembly that form housing 166 are formed as at 230 (see FIG. 7) to define solid portions 231 that form abutting surfaces 232 and 234 at the respective openings 236 and 238 through which the securing bolt 134 is received. The sections 130 and 132 are also each formed with spaced flanges 235 and 237 that engage the adapter tube from below, and tapered centering surfaces 239 and 241 that engage the adapter tube 144 from above, when the handle sections 130 and 132 are assembled together. As indicated in the sectional views of FIGS. 4-9, the sections 130 and 132 abut each other about the top and bottom of the handle assembly, except in the area of the trigger 214, the handle assembly end opening 170 over which end cap 138 is received, and the handle assembly fingers 178.

As indicated in FIG. 8, the housing sections 130 and 132 are proportioned to receive gas manifold 37, the latter comprising a one piece body 288 formed from nylon or the like, as by a suitable injection molding arrangement, including an internally threaded bore 290 that receives the adapter tube 144, a conduit portion 292 over which the end 293 of conduit 30 is applied, and defining a passage 294 that leads to passage 296 which is in turn aligned with recess 298 of adapter tube 144 in the mounted position of manifold 37. Body 288 also includes a stud portion 300 (see FIG. 8) that fits into the recesses 302 of the respective housing sections 130 and 132 to prevent shifting movement of the manifold. A suitable cement is preferably applied to threading 145 to sealingly bond the manifold 37 to tube 144.

The recess 298 of adapter tube 144 and manifold 37 defines a pooling area for the gas being supplied to the gun, the adapter tube being formed to define a plurality of passages 304 that communicate between the pooling area and adapter tube bore 250.

Gas supplied under pressure to the conduit 30 thus passes through passages 294 and 296 of manifold 37 into and through recess 298 and passage 304 in adapter tube 144 into the bore 250 of adapter tube 144, where it flows in the tolerance spacing between the welding wire 31 and the adapter tube 144 to and into the guide tube 44 and thence to the passages 122 defined by nozzle fitting element 52, the pooling chamber 124, diffuser passages 87, and then outwardly of the gas cup 16 in an annular flow about the welding wire emitting from contact tip 14.

The solid portion 231 of the handle section is grooved as at 252 to accommodate the leads from switch 192.

The sections 130 and 132 defining the housing 166 of handle assembly 26 may be formed in any suitable manner to provide the structural features indicated when assembled in the manner indicated.

The welding gun 10A of FIGS. 14-16 is basically similar to gun 10, with similar parts being indicated by corresponding reference numerals. The main differences are concerned with conveying of the shielding gas between manifold 37A and the gas cup 16.

In the nozzle assembly 12A of gun 10A, the bore 42A of body 40A is formed to define spaced ridges 356 (see FIG. 16), between the ends 357 of which is seated the guide 44, with the space between the respective adjacent ridges 356 and the guide 44 defining passages 358 extending longitudinally of body 40A.

The bore 250A of adapter tube 144A define similar spaced ridges 362, with the ridges 356 and 362 being aligned in the assembled relation of the gun to define continuous spaced gas passages 360 between the adapter tube passages 304A and the contact tip 14, where passages 360 are in communication with the gas passages 122 defined by fitting element 52. Liner 286A of adapter tube 144A is received between the ridges 362 thereof in a manner similar to guide 44.

Thus, in gun 10A, the shielding gas is conveyed from manifold 37A to the gas cup through spaced passages radially outwardly of the welding wire. Gun 10A is intended to be a smaller gun used with smaller diameter welding wire 31A, and the arrangement indicated insures adequate shielding gas supply to the gas cup.

The guns 10B and 10C are adapted for welding without shielding gas, as with conventional gasless cored welding wire (which is formed to define a bore to contain flux or the like that generates the necessary shielding gas when subjected to the arc).

In these forms of the invention, then handle assembly of the gun (not shown) may be the same as shown in FIGS. 1 or 14, with the handle assembly being suitably connected to cable 29 and gas conduit 30 being omitted. The nozzle body 40, fitting element 52, insulating sleeves 24 and 94, and clamp device 18 may be the same as employed with either gun 10 or 10A depending on the size you desire.

Gun 10B is arranged for long electrical stick out and includes shortened contact tip 14B received in fitting element 52 having received about same a filler element 380 formed from a suitable heat resistant plastic against which is seated a copper jacket 382 having a sleeve portion 384 formed to define fingers 102B for application under clamp device 18 and a stick out portion 386 containing a liner 388 formed from a suitable ceramic material and defining a bore 390 through which the welding wire passes to the arc.

Gun 10C is arranged for short stick out and comprises a contact tip 14 received in fitting element 52 and having applied about same a filler element 392 held in place by a jacketing sleeve 394 that is flanged as at 396 to engage element 392 and is slotted to define fingers 102C that are applied under clamp device 18.

It will therefore be seen that I have provided in an MIG welding gun arrangement, a nozzle structure which not only insures adequate cooling of the gas cup and contact tip as well as the necessary electrical insulating of the gas cup from the welding current, but also provides a single clamping arrangement for securing both the welding cup and the contact tip to the nozzle without requiring screw threading of either element.

The heat transfer path from the gas cup is through the relatively wide and long transfer area defined by the electrically insulating heat transfer sleeve 24 from which the heat passes through nozzle fittings 52 and 53 to nozzle end 48 and fins 22.

Furthermore, a clamping device joins the nozzle structure to the handle structure that is similar to that securing in place the gas cup and contact tip and provides a fixed but adjustable connection that permits ready adjustment and/or replacement of the nozzle at the option of the operator. The same arrangement permits the operator to dispose the trigger switch in any position he desires relative to the nozzle, the pivotal disposition of the trigger permitting ready operation of the trigger switch when the handle assembly is held upside down.

The handle forming assembly is made in two parts that are readily separated for any maintenance that may be necessary. The two section construction of the housing adapts this structure for economical injection molding production procedures or the like. The clamp type connection between the handle and nozzle assemblies serves as the primary strength point of the gun, which need be only long enough to provide a good electrical contact since the handle assembly is also braced in the area of the connecting bolt. The overall result is that the handle is adequately strong while being sufficiently small diameter-wise to be comfortably gripped by the user and still provide long leverage to work with in handling the gun.

The single piece construction of the nozzle body 40 and the arrangement of its fins 22 adapts this component of the invention for economical extrusion forming methods, after which the ends of the body may be readily turned down to define end portions 48 and 50 and suitably threaded for application thereto of the end fittings 52 and 54. The body 40 may then have the guide tube applied thereto and be bent to the angle indicated in any suitable manner.

In combination, the over-all assemblage is of very light and easily maneuverable construction, yet is well suited for long lived multipurpose operation.

The foregoing description and the drawings are given merely to explain and illustrate my invention and the invention is not to be limited thereto, except insofar as the appended claims are so limited, since those skilled in the art who have my disclosure before them will be able to make modifications and variations therein without departing from the scope of the invention.

I claim:

1. In a nozzle for gas shielded consumable electrode welding guns in which the nozzle is formed to define means for supplying welding wire and shielding gas to the arc and includes an elongate electrically conductive body formed to define a guide passage extending longitudinally thereof for guiding the welding wire through the nozzle, with said passage having a welding wire intake end and a welding wire discharge end, a contact tip removably secured in electrical conducting relation to said body at said discharge end of said guide passage through which the welding wire passes to the arc, and a gas cup received about the contact tip and carried by the nozzle structure for directing shielding gas supplied through the body to and between the cup and the contact tip to the arc, the improvement wherein:

said body at said discharge end of said passage has an end portion that is annularly contractable about said passage discharge end, said contact tip being received in said body end portion, said gas cup having one end portion received over said body one end portion, said gas cup one end portion being annularly contractable, means for releasably clamping said gas cup one end portion against said body one end portion to secure both said contact tip and gas cup to said body, and annularly contractable heat transfer means interposed between said gas cup and said body end portion, said heat transfer means being formed from a heat conductive material having an electrically insulating surfacing.

2. In a welding gun for gas shielded consumable electrode welding including a nozzle structure defining means for supplying welding wire and shielding gas to the arc including an elongate electrically conductive body formed to define a guide passage extending longitudinally thereof for guiding the welding wire through the nozzle structure, with said passage having a welding wire intake end and a welding wire discharge end, a contact tip removably secured in electrical conducting relation to said body at said discharge end of said guide passage through which the welding wire passes to the arc, and a gas cup received about the contact tip and carried by the nozzle structure for directing shielding gas supplied through the nozzle structure to and between the cup and the contact tip to the arc, the improvement wherein:

said body at said discharge end of said passage has an end portion that is annularly contractable about said passage discharge end, said contact tip being received in said body end portion, said gas cup having one end portion received over said body one end portion, said gas cup one end portion being annularly contractable, and means for releasably clamping said gas cup one end portion against said body one end portion to secure both said contact tip and gas cup to said body.

3. The improvement set forth in claim 2 including:

annularly contractable heat transfer means interposed between said gas cup and said body end portion, said body being formed to define heat dissipating fins along a substantial portion of the length thereof for radiating therefrom heat that is conducted to same from said tip and from said cup through said heat transfer means.

4. The improvement set forth in claim 3 wherein:

said heat transfer means comprises an annularly contractable sleeve formed from a heat conductive material having an electrically insulating covering.

5. The improvement set forth in claim 2 wherein:

said body end portion comprises a sleeve threaded on said body and slotted transversely thereof to define a plurality of gripping fingers between which said tip is received.

6. The improvement set forth in claim 4 wherein:

said annularly contractable sleeve is formed from aluminum and is hard anodic coated.

7. The improvement set forth in claim 2 including:

a gas diffuser member received over said contact tip between said tip and said gas cup and defining spaced orifice means thereabout for passing shielding gas therethrough, and a weld spatter shield carried by said tip in protecting relation to said diffuser member orifice means.

8. The gun set forth in claim 5 including:

a gas diffuser received over said contact tip between said tip and said cup and defining spaced orifice means thereabout for passing shielding gas therethrough, said diffuser including means interengaging with said nozzle structure fingers and said annularly contractable sleeve to locate said sleeve in a predetermined position.

9. In a welding gun for gas shielded consumable electrode welding including a nozzle structure defining means for supplying welding wire and shielding gas to the arc including an elongate electrically conductive body formed to define a guide passage extending longitudinally thereof for guiding the welding wire through the nozzle structure, with said passage having a welding wire intake end and a welding wire discharge end, a contact tip removably secured in electrical conducting relation to said body at said discharge end of said guide passage through which the welding wire passes to the arc, and a gas cup received about the contact tip and carried by the nozzle structure for directing shielding gas supplied through the nozzle structure to and between the cup and the contact tip to the arc, the improvement wherein:

said body at said discharge end of said passage has an end portion slotted transversely thereof to define a plurality of gripping fingers about said passage discharge end, said contact tip being received between said fingers, an annularly contractable sleeve received over said fingers of said body end portion and being formed from a heat conductive material having a heat conductive electrically insulating surface, said gas cup having one end thereof received over and engaging said sleeve, said gas cup one end being formed to define a plurality of fingers extending longitudinally thereof, and means for releasably clamping said gas cup fingers against said contractable sleeve to contract said body fingers against said contact tip and secure both said contact tip and said gas cup to said body, said body being finned along the sides thereof for radiating therefrom heat that is conducted to same from said tip and from said cup through said sleeve.

10. The improvement set forth in claim 9 including:

a gas diffuser member received over said contact tip between said tip and said gas cup and including an annular shoulder engaging said gas cup and disposed adjacent said fingers of said body, with the space between said fingers of said body being formed to define gas passage conduit means between said body guide passage and said gas diffuser member, said diffuser member being formed to define gas passages therethrough and spaced thereabout communicating through said diffuser member.

11. The improvement set forth in claim 10 including an annular seal element interposed between said gas diffuser and said contractable sleeve and filling the space between said gas cup and said body end portion.

12. The improvement set forth in claim 9 wherein:

said body is formed from aluminum and the exterior of same is hard anodic coated to provide same with an electrically insulating coating.

13. The improvement set forth in claim 9 including:

a wire helix guide tube extending through said guide passage between said intake end and said discharge end thereof.

14. In a welding gun for consumable electrode welding including a nozzle structure having a handle structure secured thereto with said nozzle structure defining means for supplying welding wire to the arc including an elongate electrically conductive body formed to define a guide passage extending longitudinally thereof for guiding the welding wire through the nozzle structure, with said passage having a welding wire intake end and a welding wire discharge end, a contact tip removably secured in electrical conducting relation to said body at said discharge end of said guide passage through which the welding wire passes to the arc, and a sleeve received about the contact tip and carried by the body, the improvement wherein:

said body is curved in a plane passing through its longitudinal axis to define a gooseneck shape, said body at said discharge end of said passage being slotted transversely thereof to define a plurality of gripping fingers, said contact tip being received between said fingers, said sleeve being applied about said contact tip and having one end portion received over said body fingers, annularly contractable heat transfer means having electrically insulating characteristics interposed between said sleeve one end and said body fingers, said sleeve one end being formed to define a plurality of fingers, and means for releasably clamping said sleeve fingers against said heat transfer means and said body fingers to secure both said contact tip and said sleeve to said body.

15. The improvement set forth in claim 14 wherein:

said body defines heat dissipating fins along a substantial portion of the length thereof for radiating therefrom heat that is conducted to same from said sleeve and said tip, said fins laying in planes parallel and perpendicular to said plane of said body.

16. The improvement set forth in claim 14 wherein:

said sleeve comprises a gas cup for gas shielded welding.

17. The improvement set forth in claim 14 wherein:

said sleeve is formed for gasless cored wire welding.

18. The welding gun set forth in claim 14 wherein said handle structure comprises:

an adapter tube defining a guide passage for welding wire and disposed at said intake end of said body passage, said adapter tube including means for connecting same to a source of electrical energy and means for guiding the welding wire through same into said body guide passage, and a shell structure overlying said adapter tube including a hand gripping portion for gripping by the operator, and means for releasably securing said handle structure to said body and comprising:

portions of said body and said shell structure being slotted longitudinally thereof and arranged in intercalculated relation over said adapter tube, and means for releasably clamping said body and shell structure portions to said adapter tube to secure said same together in fixed but adjustable relation.

19. The improvement set forth in claim 18 wherein:

said handle structure shell structure is sectionalized longitudinally thereof, and including means for releasably securing said handle structure shell structure sections together over said adapter tube.

20. The improvement set forth in claim 19 wherein:

said housing sections define a sectionalized trigger switch chamber that is completed when said sections are secured together, a trigger switch positioned in said chamber, and mounting pin means extending between said housing sections and said switch for mounting said switch in said chamber.

* * * * *